(12) United States Patent
Pan

(10) Patent No.: US 8,279,560 B1
(45) Date of Patent: Oct. 2, 2012

(54) HEAD STACK ASSEMBLY WITH SUSPENSION TAIL BOND ALIGNMENT BY SOLDER PIN

(75) Inventor: Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 632 days.

(21) Appl. No.: 12/397,878

(22) Filed: Mar. 4, 2009

(51) Int. Cl.
*G11B 5/48* (2006.01)

(52) U.S. Cl. .................. 360/244.3; 360/244; 360/244.1; 360/244.2

(58) Field of Classification Search ................. 360/244.3
See application file for complete search history.

(56) References Cited

U.S. PATENT DOCUMENTS

| | | |
|---|---|---|
| 4,714,435 A | 12/1987 | Stipanuk et al. |
| 5,348,488 A | 9/1994 | Green et al. |
| 5,415,555 A | 5/1995 | Sobhani |
| 5,422,764 A | 6/1995 | McIlvanie |
| 5,612,841 A | 3/1997 | Johnson |
| 5,631,786 A | 5/1997 | Erpelding |
| 5,668,684 A | 9/1997 | Palmer et al. |
| 5,827,084 A | 10/1998 | Biernath |
| 5,903,413 A | 5/1999 | Brooks, Jr. et al. |
| 5,920,465 A | 7/1999 | Tanaka |
| 5,947,750 A | 9/1999 | Alcoe et al. |
| 6,007,669 A | 12/1999 | Crumly et al. |
| 6,134,770 A | 10/2000 | Heeren et al. |
| 6,145,188 A | 11/2000 | Brooks, Jr. et al. |
| 6,185,075 B1 | 2/2001 | Tsujino et al. |
| 6,212,046 B1 | 4/2001 | Albrecht et al. |
| 6,360,426 B1 | 3/2002 | Summers et al. |
| 6,367,144 B1 | 4/2002 | Holaway et al. |
| 6,386,434 B1 | 5/2002 | Wong |
| 6,399,889 B1 | 6/2002 | Korkowski et al. |
| 6,529,350 B1 | 3/2003 | Itoh |
| 6,634,086 B2 | 10/2003 | Korkowski et al. |
| 6,672,879 B2 | 1/2004 | Neidich et al. |
| 6,757,136 B2 | 6/2004 | Buske et al. |
| 6,758,686 B2 | 7/2004 | Burdick |
| 6,765,763 B2 | 7/2004 | SeeToh et al. |
| 7,059,868 B1 | 6/2006 | Yan |
| 7,110,222 B2 | 9/2006 | Erpelding |
| 7,414,814 B1 | 8/2008 | Pan |
| 7,482,800 B2 | 1/2009 | Ooyabu et al. |
| 7,522,382 B1 | 4/2009 | Pan |
| 7,525,767 B2 | 4/2009 | Erpelding |
| 7,538,981 B1 * | 5/2009 | Pan ........................... 360/264.2 |
| 7,760,470 B2 | 7/2010 | Wu et al. |
| 7,907,369 B1 | 3/2011 | Pan |
| 8,064,170 B1 | 11/2011 | Pan |
| 8,068,314 B1 | 11/2011 | Pan et al. |
| 2001/0021596 A1 | 9/2001 | Tamura |
| 2004/0228039 A1 | 11/2004 | Wu et al. |
| 2005/0042894 A1 | 2/2005 | Wu et al. |
| 2005/0237672 A1 | 10/2005 | Kamigama et al. |
| 2005/0243472 A1 | 11/2005 | Kamigama et al. |
| 2007/0075056 A1 | 4/2007 | Ho et al. |
| 2007/0153427 A1 | 7/2007 | Izumi et al. |
| 2007/0279807 A1 | 12/2007 | Kobayashi et al. |
| 2008/0225439 A1 | 9/2008 | Komura |

* cited by examiner

*Primary Examiner* — Jami M Valentine

(57) ABSTRACT

A flexure tail of a head gimbal assembly (HGA) is aligned with a flex cable of a head stack assembly (HSA). At least one solder ball is adhered to a bond pad on the flex cable. The solder ball is entered into a first alignment hole in the flexure tail while the solder ball is solid.

19 Claims, 10 Drawing Sheets

HEAD STACK ASSEMBLY WITH SUSPENSION TAIL BOND ALIGNMENT BY SOLDER PIN

BACKGROUND OF THE INVENTION

1. Field of the Invention

The present invention relates generally to the field of information storage devices, and more particularly to the assembly of head stacks used in such devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flex cable. The plurality of HGAs are attached to various arms of the actuator, and each of the laminated flexures of the HGAs has a flexure tail that is electrically connected to the HSA's flex cable.

To facilitate reliable electrical connection and secure attachment of the flexure tail(s) to the flex cable, for example by soldering, the flexure tail(s) must first be precisely positioned on or adjacent the flex cable. Such positioning must be maintained while electrical connection and secure attachment is established. Accordingly, there is a need in the art for improved flexure tail and flex cable configurations to facilitate and maintain relative alignment during attachment of the flexure tail(s) to a flex cable.

SUMMARY

According to an aspect of the present invention, a method to align a flexure tail of a head gimbal assembly (HGA) to a flex cable of a head stack assembly (HSA) is disclosed. The method includes adhering at least one solder ball to a bond pad on the flex cable. The method also includes entering the solder ball into a first alignment hole in the flexure tail while the solder ball is solid.

According to another aspect of the present invention, a novel head stack assembly (HSA) is disclosed. The HSA includes an actuator including an actuator body and an actuator arm extending from the actuator body. The HSA also includes a flex cable adjacent the actuator body, the flex cable including a plurality of bond pads and at least one solid solder ball adhered to at least one of the plurality of bond pads. The HSA also includes a head gimbal assembly (HGA) attached to the actuator arm. The HGA includes a load beam, a laminated flexure attached to the load beam, and a head attached to the laminated flexure. The laminated flexure includes a flexure tail that includes a plurality of conductive traces. The flexure tail includes a terminal region where the plurality of conductive traces terminate at a corresponding plurality of electrical terminals that are configured to be electrically connected to the flex cable. The terminal region includes a first alignment hole. The at least one solid solder ball protrudes into the first alignment hole.

DETAILED DESCRIPTION OF EXEMPLARY EMBODIMENTS

Figure 1:
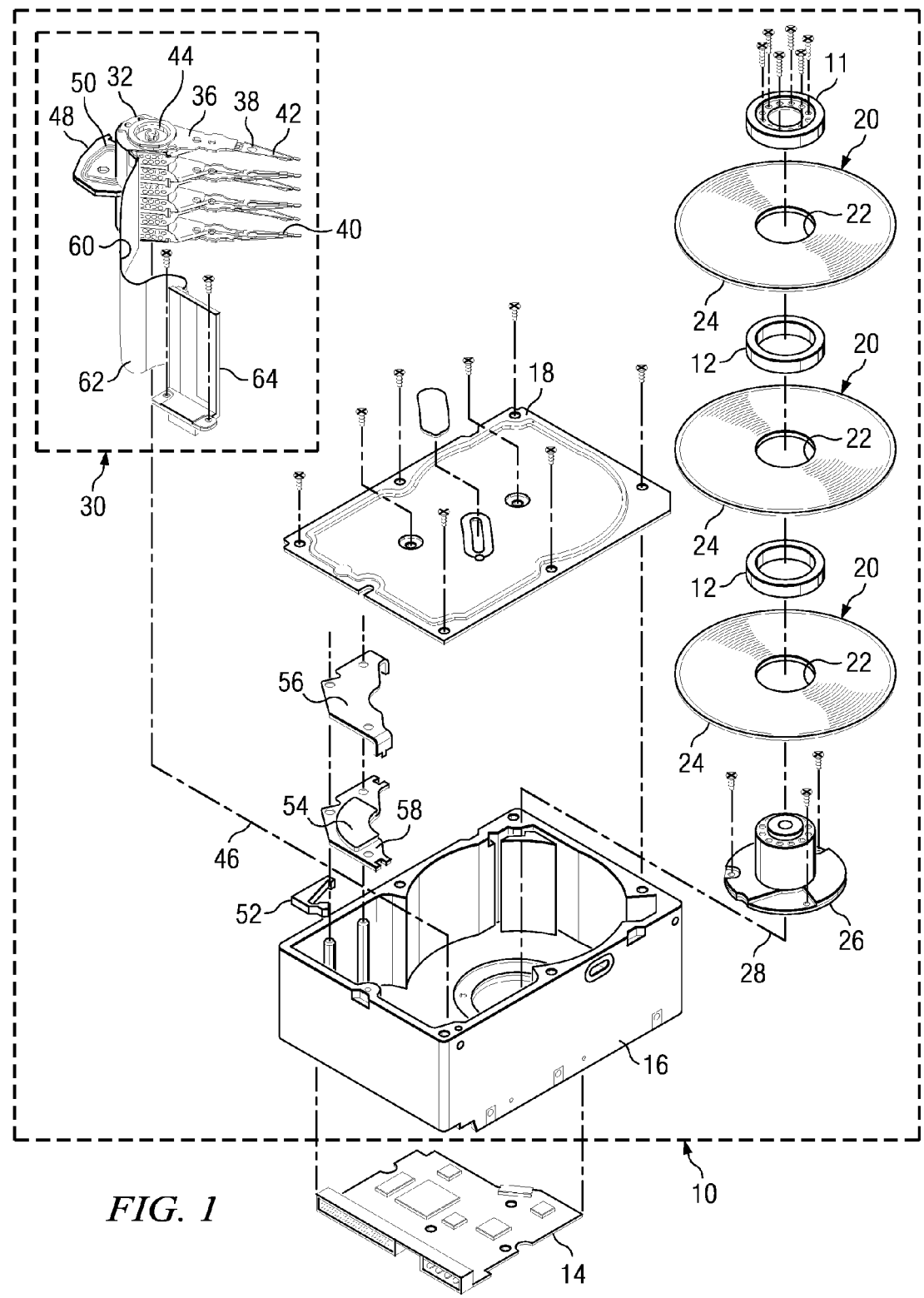
FIG. 1 is an exploded top perspective view of a disk drive including a head stack assembly that incorporates an embodiment of the present invention.

FIG. 1 illustrates a disk drive capable of including an embodiment of the present invention. The disk drive includes a head disk assembly (HDA) 10 and a printed circuit board assembly (PCBA) 14. The HDA 10 includes a base 16 and cover 18 that together house at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

The HDA 10 further includes a head stack assembly (HSA) 30 rotatably attached to the base 16 of HDA 10. The HSA 30 includes an actuator comprising an actuator body 32 and one or more actuator arms 36 extend from the actuator body 32. The actuator body 32 includes a bore 44 and a pivot bearing cartridge engaged within the bore for facilitating the HSA 30 to rotate relative to HDA 10 about actuator pivot axis 46. One or two head gimbal assemblies (HGA) 38 are attached to a distal end of each actuator arm 36. Each HGA includes a head (e.g. head 40) for reading and writing data from and to the disk 20. The HSA 30 further includes a coil support 48 that extends from one side of the HSA 30 that is opposite head 40. The coil support 48 is configured to support a coil 50 through which a changing electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

The PCBA 14 includes a servo control system for generating servo control signals to control the current through the coil 50 and thereby position the HSA 30 relative to tracks disposed upon surfaces of disk 20. The HSA 30 is electrically connected to PCBA 14 via a flex cable assembly 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
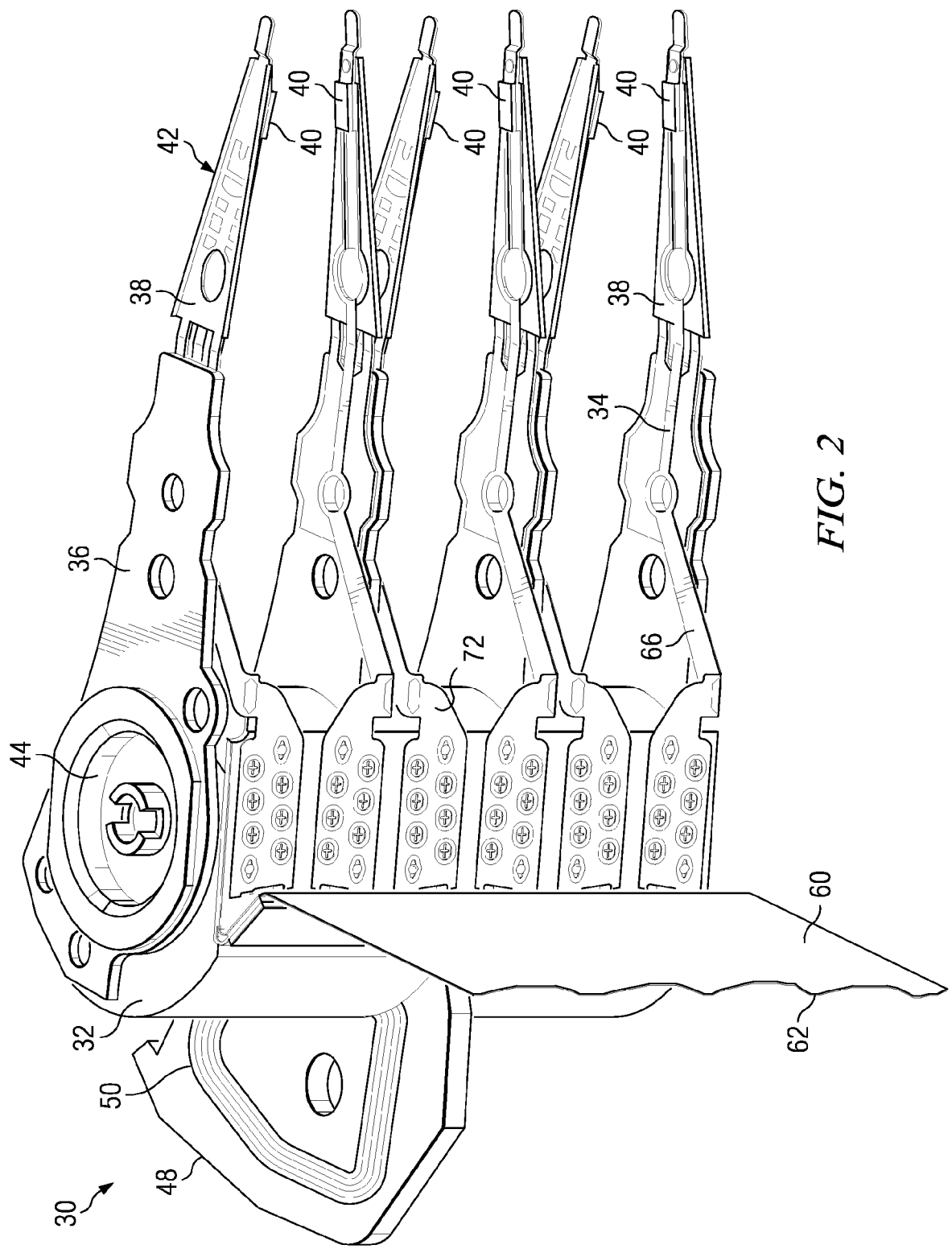
FIG. 2 is a perspective view of a head stack assembly that incorporates an embodiment of the present invention.

Now referring to FIG. 2, the head 40 is attached to and is electrically connected to a laminated flexure 34 that is a sub-component of the HGA 38 and is much smaller than the flex cable 62 of the HSA 30. The laminated flexure 34 has a gimbal region adjacent one end and a tail region adjacent an opposing end, the head 40 being attached to the laminated flexure 34 in the gimbal region, and the tail region including a flexure tail 66 that includes a terminal region 72. The laminated flexure 34 is attached to a load beam 42 that is also a sub-component of the HGA 38. The purpose of the load beam 42 is to provide vertical compliance for the head 40 to follow vertical undulation of the surface of disk 20 as it rotates, and to preload the head 40 against the surface of disk 20 as it rotates, by a preload force that is commonly referred to as the "gram load." A first purpose of the laminated flexure 34 is to provide compliance for the head 40 to follow pitch and roll angular undulations of the surface of disk 20 as it rotates, while restricting relative motion between the head 40 and the load beam 42 in the lateral direction and about a yaw axis. A second purpose of the laminated flexure 34 is to provide a plurality of electrical paths to the head to facilitate signal transmission to/from the head 40.

For that second purpose, the laminated flexure 34 includes electrically conductive traces that are isolated from a structural layer by a dielectric layer. For example, the conductive traces may comprise copper, the structural layer may comprise stainless steel, and the dielectric layer may comprise polyimide. Portions of the electrically conductive traces are sometimes coated with an insulative cover layer (e.g. a polymer layer). So that the signals from/to the head 40 can reach the flex cable 62 near the actuator body, each HGA laminated flexure 34 includes a flexure tail 66 that extends away from the head 40 along the actuator arm 36 and ultimately attaches to the flex cable 62 adjacent the actuator body 32. That is, the laminated flexure 34 includes traces that extend from adjacent the head 40 and terminate at electrical connection points at a terminal region 72 of the flexure tail 66.

Figure 3A:
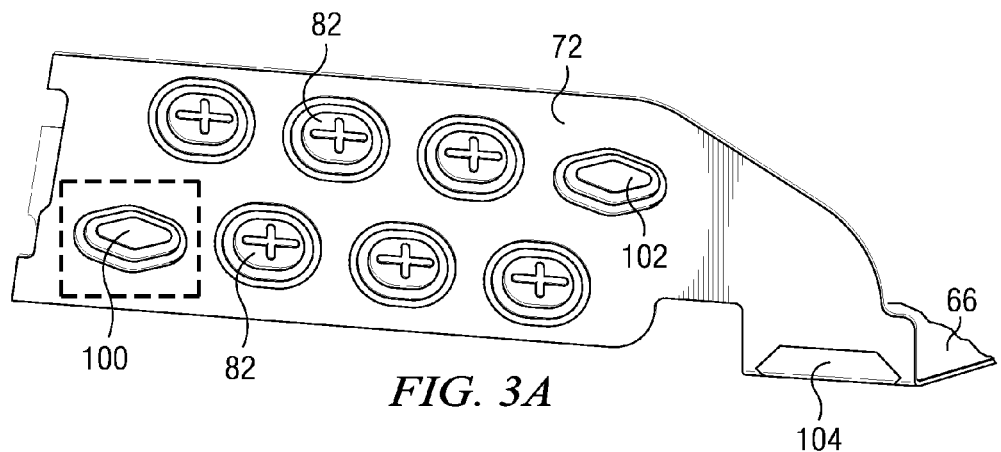
FIG. 3A depicts a terminal region of a flexure tail according to an embodiment of the present invention.
Figure 4A:
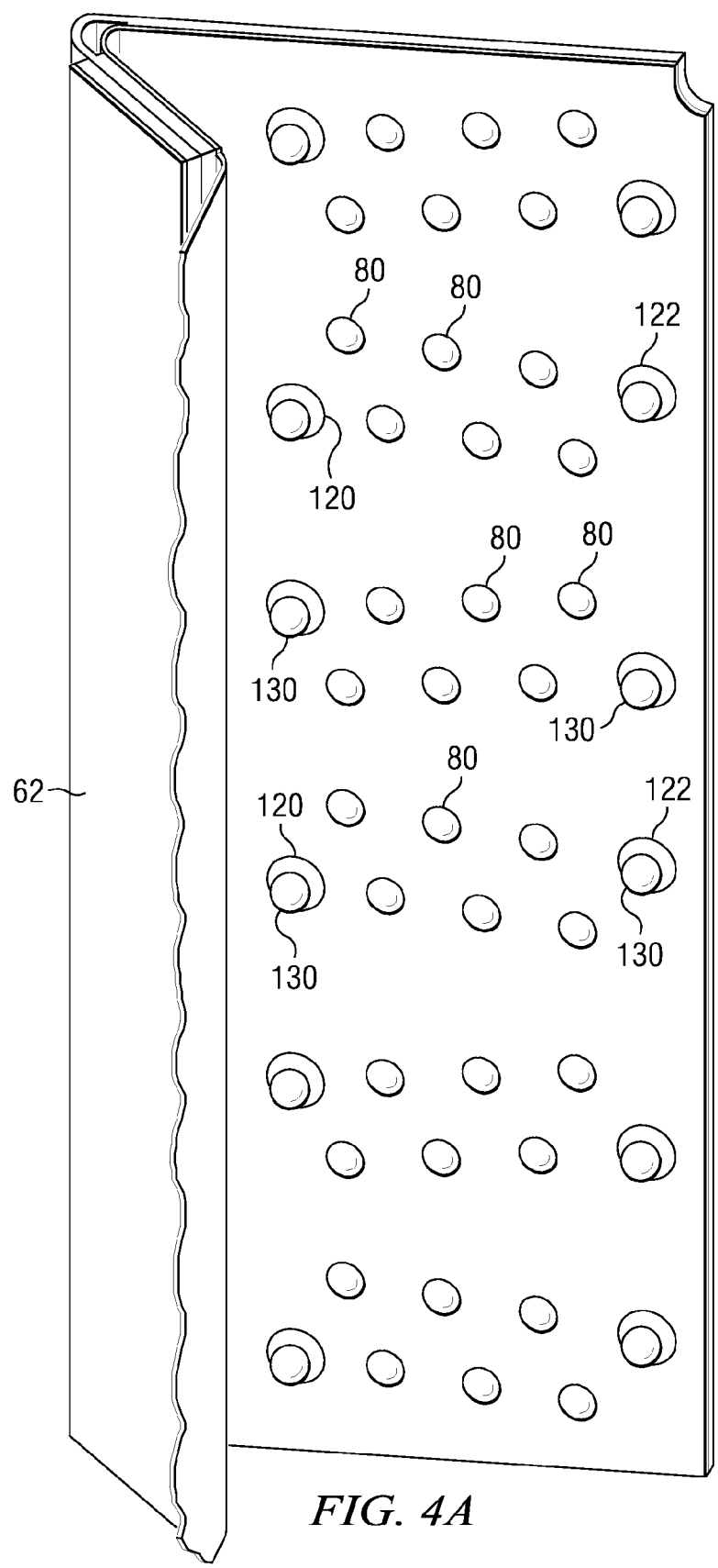
FIG. 4A depicts a portion of a flex cable according to an embodiment of the present invention.

Now referring additionally to FIGS. 3A and 4A, the terminal region 72 includes the plurality of electrical terminals 82. The flex cable 62 includes electrical conduits that terminate at electrical connection points 80 which correspond to the electric terminals 82 of the terminal region 72 of the flexure tail 66. Methods of electrical connection of the flexure tail 66 to the flex cable 62 include ultrasonic tab bonding, solder reflow, and solder ball jet (SBJ).

To electrically connect and securely attach the flexure tails 66 to the flex cable 62, the flexure tails 66 must first be aligned with and positioned on or adjacent the flex cable 62, and then held in alignment (at least temporarily) while electrical connection is established and secure attachment is completed. To accomplish this according to certain embodiments of the present invention, certain structural features are created in the flexure tails 66 and in the flex cable 62 that is attached to the actuator body 32. For example, the flexure tail 66 of the example embodiment shown in FIG. 3A includes alignment holes 100 and 102 in the terminal region 72, and the plurality of bond pads of flex cable 62 shown in FIGS. 4A and 4B include not only the electrical connection points 80, but also additional bond pads 120 and 122.

In the embodiment of FIG. 4A, solder balls 130 are shown to be adhered to the bond pads 120 and 122. Alignment of the flexure tail 66 with the flex cable 62 may be facilitated, at least in part, by the solder ball 130 protruding from bond pad 120 (to which it is attached) into the alignment hole 100 in the terminal region 72 of the flexure tail 66.

In the embodiment of FIG. 3A, the flexure tail 66 (e.g. of the laminated flexure 34) also includes an optional second alignment hole 102, for example to facilitate angular alignment. For example, angular alignment of the flexure tail 66 with the flex cable 62 may be facilitated, at least in part, by the solder ball 130 protruding from bond pad 122 (to which it is attached) into the alignment hole 102 in the terminal region 72 of the flexure tail 66. However, angular alignment may also be accomplished by other methods such as a clocking registration surface or edge (e.g. contact between a registering surface of the flex cable, actuator, or tool, and an edge of the terminal region 72).

Figure 3B:
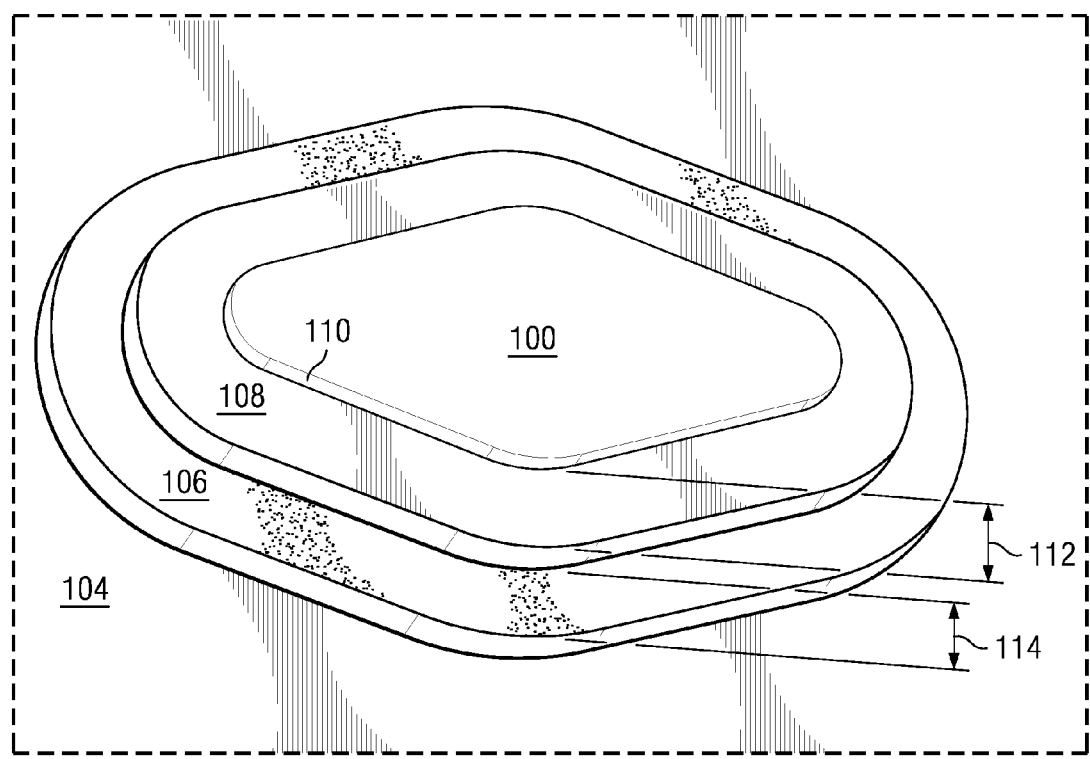
FIG. 3B is a close-up view of an alignment hole in the terminal region of the flexure tail of FIG. 3A.

FIG. 3B is a close-up view of an alignment hole in the terminal region of the flexure tail of FIG. 3A. In the embodiment of FIG. 3B, the shape of the alignment hole 100 is not round. Rather, it is generally diamond shaped with a maximum length in the range of 100 µm to 400 µm greater than the diameter of the solid solder ball that will enter it, and a maximum width that is 0 µm to 20 µm less than the diameter of the solid solder ball that will enter it. Therefore, when the solid solder ball enters the alignment hole 100, it will interfere as it enters, requiring deformation of the interior edge of the alignment hole.

Also, in the embodiment of FIGS. 3A and 3B, the flexure tail 66 comprises a laminate that includes a structural layer 104, a dielectric layer 106, and a conductive layer 108, with the conductive layer 108 defining an interior edge 110 of the alignment hole 100. The conductive copper layer 108 preferably comprises copper or another malleable electrically conductive metal. Also in this embodiment, the dielectric layer 106 is radially recessed from the interior edge 110 of the alignment hole 100, relative to the conductive layer 108, by a distance 112. Preferably but not necessarily, the distance 112 is in the range 30 µm to 50 µm. Also in the embodiment of FIG. 3B, the structural layer 104 is radially recessed from the interior edge 110 of the alignment hole 100, relative to the dielectric layer 106, by a distance 114. Preferably but not necessarily, the distance 114 is also in the range 30 µm to 50 µm.

The recession 112 of the dielectric layer 106 (and the structural layer 104) from the interior edge 110 of the conductive layer 108 surrounding the alignment hole 100 may allow the interior edge 110 of the alignment hole 100 to deform to accommodate entry of an interfering solid solder ball, because the alignment hole contour is then defined by only the malleable conductive metal (e.g. copper) sub-layer rather than the multi-layer laminate (which would be more rigid). Moreover the accuracy of the location of the alignment hole 100 with respect to the electrical terminals 82 may be enhanced because, in this embodiment, the same mask that patterns the copper layer may define them concurrently. This may improve the accuracy and/or repeatability of the ultimate alignment between the flexure tail 66 and the flex cable 62, because it may avoid tolerance stack-up that may otherwise occur when alignment is accomplished using other features or structures, such as a flex cable stiffener.

Figure 4B:
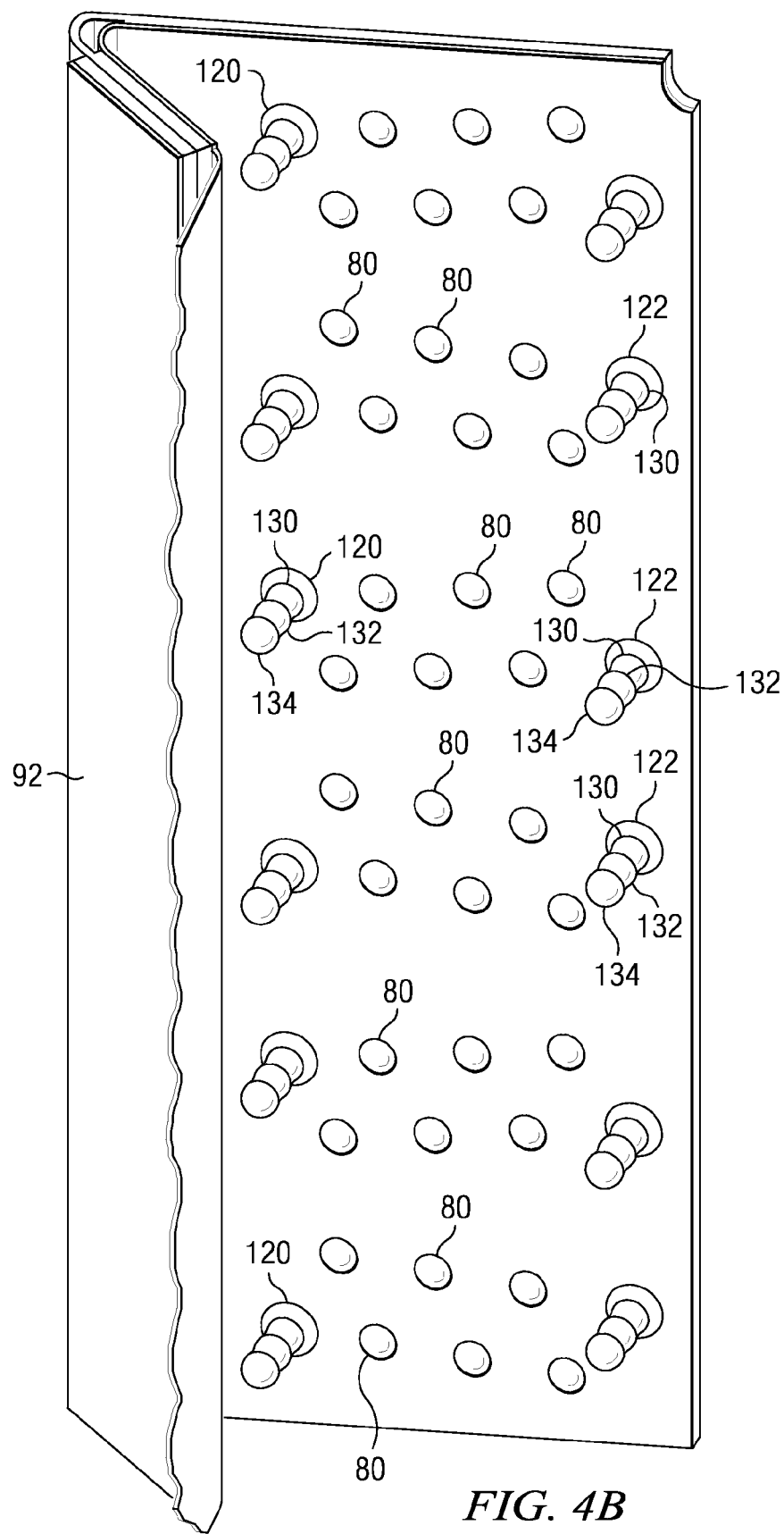
FIG. 4B depicts a portion of a flex cable according to another embodiment of the present invention.

FIG. 4B depicts a portion of a flex cable 92 according to another embodiment of the present invention. Features of flex cable 92 of FIG. 4B that are similar to features of flex cable 62 of FIG. 4A are labeled with the same numbers. In the embodiment of FIG. 4B, second solid solder balls 132 are adhered on top the first solid solder balls 130 in stack arrangements, to form solid solder pins. These solid solder pins protrude from the bond pads 122 and pass through alignment hole in the flexure tails (e.g. alignment holes 100 and 102 of flexure tail 66 shown in FIG. 3A). In the embodiment of FIG. 4B, third solid solder balls 134 are also optionally adhered on top the stacks that comprise solid solder balls 130 and 132. Preferably but not necessarily, each of the solid solder pins comprises no more than five solder balls, each preferably having a diameter in the range 50 μm to 400 μm.

Figure 5A:
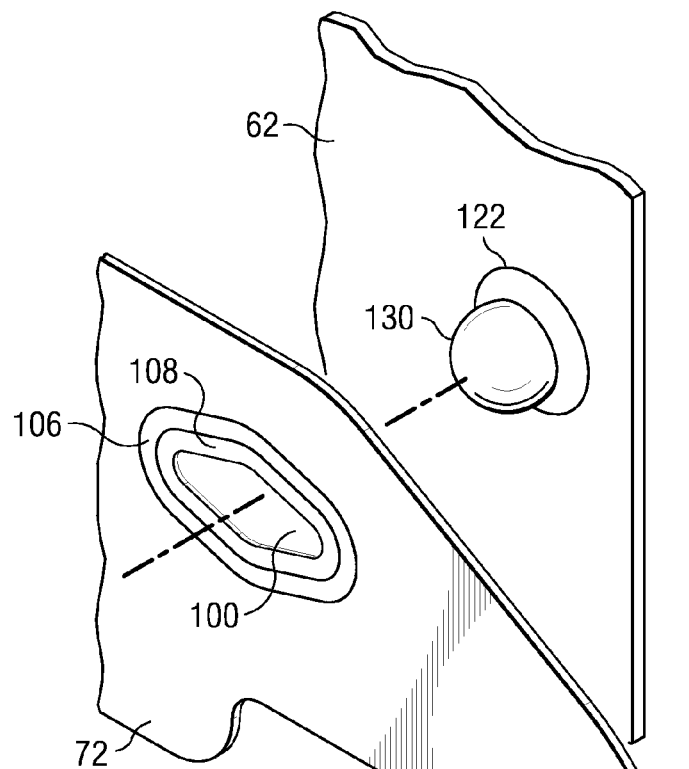
FIGS. 5A-5B depicts a method to align a flexure tail with a flex cable according to an embodiment of the present invention.
Figure 5B:
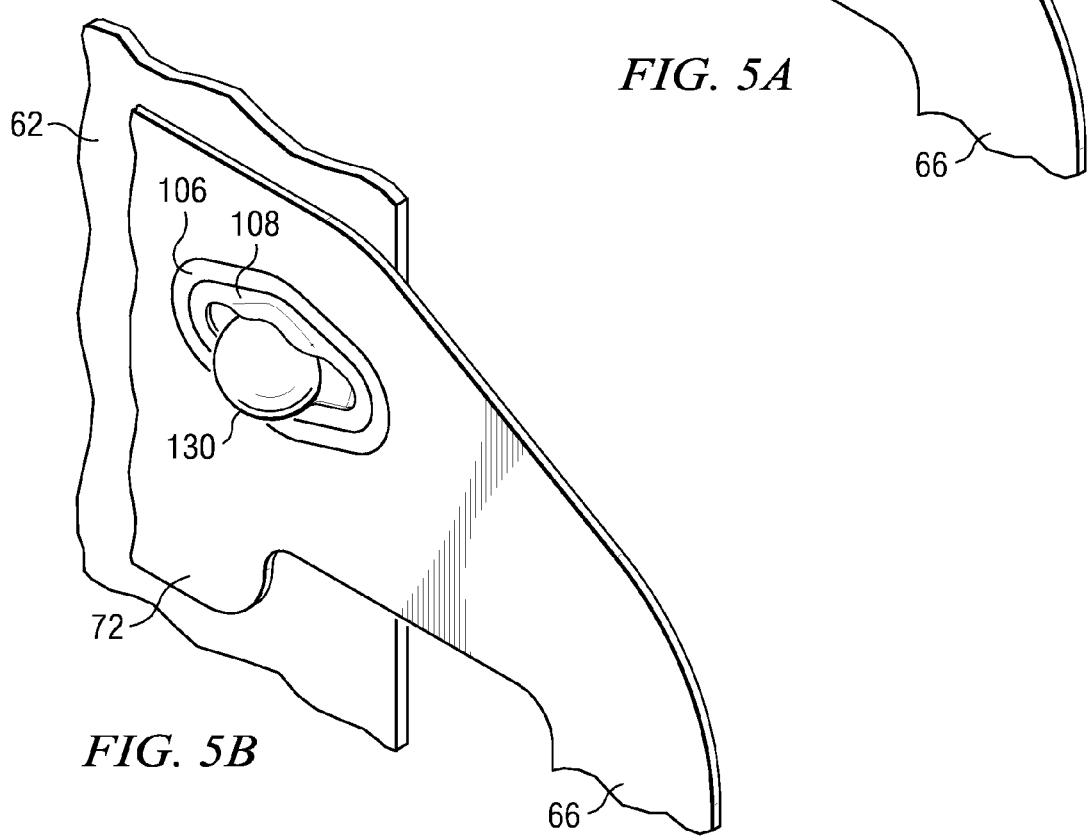

FIGS. 5A-5B depict an example method to use the solder pins to align the flexure tail 66 with the flex cable 62. Now referring additionally to FIGS. 5A-5B, at least one solder ball 130 is adhered to a bond pad 122 on the flex cable 62. The flexure tail 66 is initially approximately aligned with the flex cable 62 (e.g. so that the electrical terminals 82 of the terminal region 72 are approximately aligned with the connection point bond pads 80 of the flex cable 62, and the bond pads 122 are approximately aligned with corresponding alignment holes 100). After initial alignment or as part of alignment, as shown in FIG. 5B, the solder ball 130 is entered into the alignment hole 100 in the flexure tail 66 while the solder ball 130 is solid.

Note that in the embodiment of FIG. 5B there is some interference between the solder ball and the alignment hole 100 (e.g. although the diameter of the solder ball 130 is less than the maximum length of the alignment hole 100, it is more than the width of the alignment hole 100) so that as the solder pin including solid solder ball 130 enters into the alignment hole 100, the conductive layer 108 must deform to accommodate entry of the solid solder ball 130. For example, the conductive layer 108 may comprise copper that deforms to accommodate the solid solder ball 130.

Figure 5C:
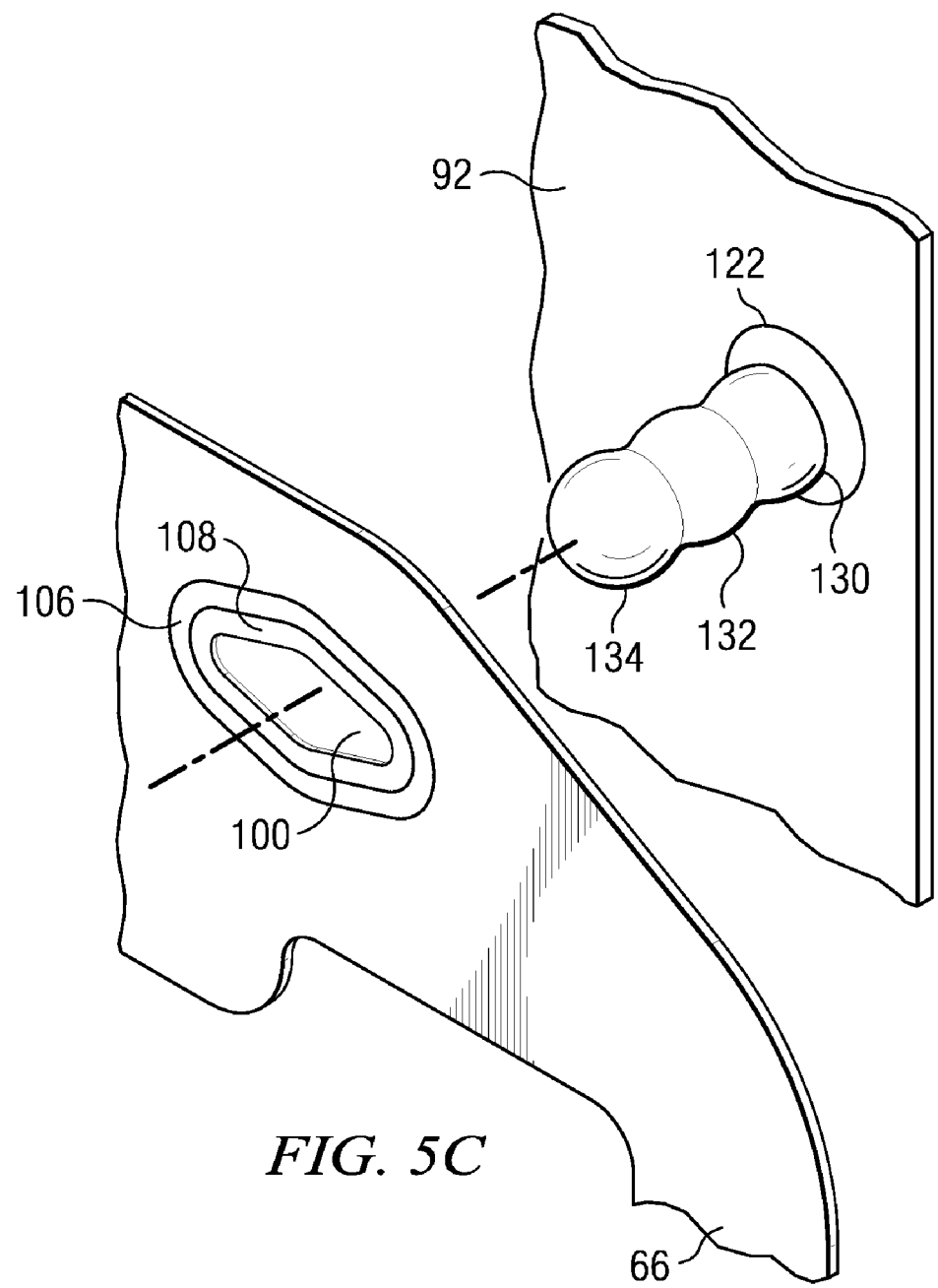
FIG. 5C depicts a method to align a flexure tail with a flex cable according to another embodiment of the present invention.

FIG. 5C depicts a method to align a flexure tail 66 with a flex cable 92 according to another embodiment of the present invention. This method is similar to the method described with reference to FIGS. 5A-5B, except that the solder pin that protrudes from the bond pad 122 on the flex cable 92 comprises a stack of three solid solder balls 130, 132, 134 that have been adhered to one another in a stack arrangement. Notice from FIG. 5C that the solder balls, when adhered in a stack arrangement, may not be perfectly spherical but instead may have flowed together somewhat so as to have been flattened somewhat at the interfaces between the balls (and at the location of attachment to the bond pad 122). However, when the solder pin(s) is used for alignment (i.e. when the solder pin enters the alignment hole 100 in the terminal region 72 of the flexure tail 66), the solder balls 130, 132, and 134 are solid (i.e. in the solid phase as opposed to being in the liquid phase when entering the alignment hole 100). In the liquid phase, the solder cannot appreciably resist shear forces and therefore does not substantially effect alignment enough to be a practical alignment feature. Still, it is contemplated that sometime after alignment (i.e. after the solid solder ball(s) of the alignment pin enters the alignment hole 100) the terminal region 72 of the flexure tail 66, and the flex cable 92 (or 62) may be heated in a region around the solder ball 130, until the solder pin melts. However, as described above, from an alignment viewpoint the solid solder pin is very different from a conventional solder cleat that enters a hole in a bond pad in the liquid phase and then later solidifies into a shape that could not pass through the hole in the solid phase.

Figure 5D:
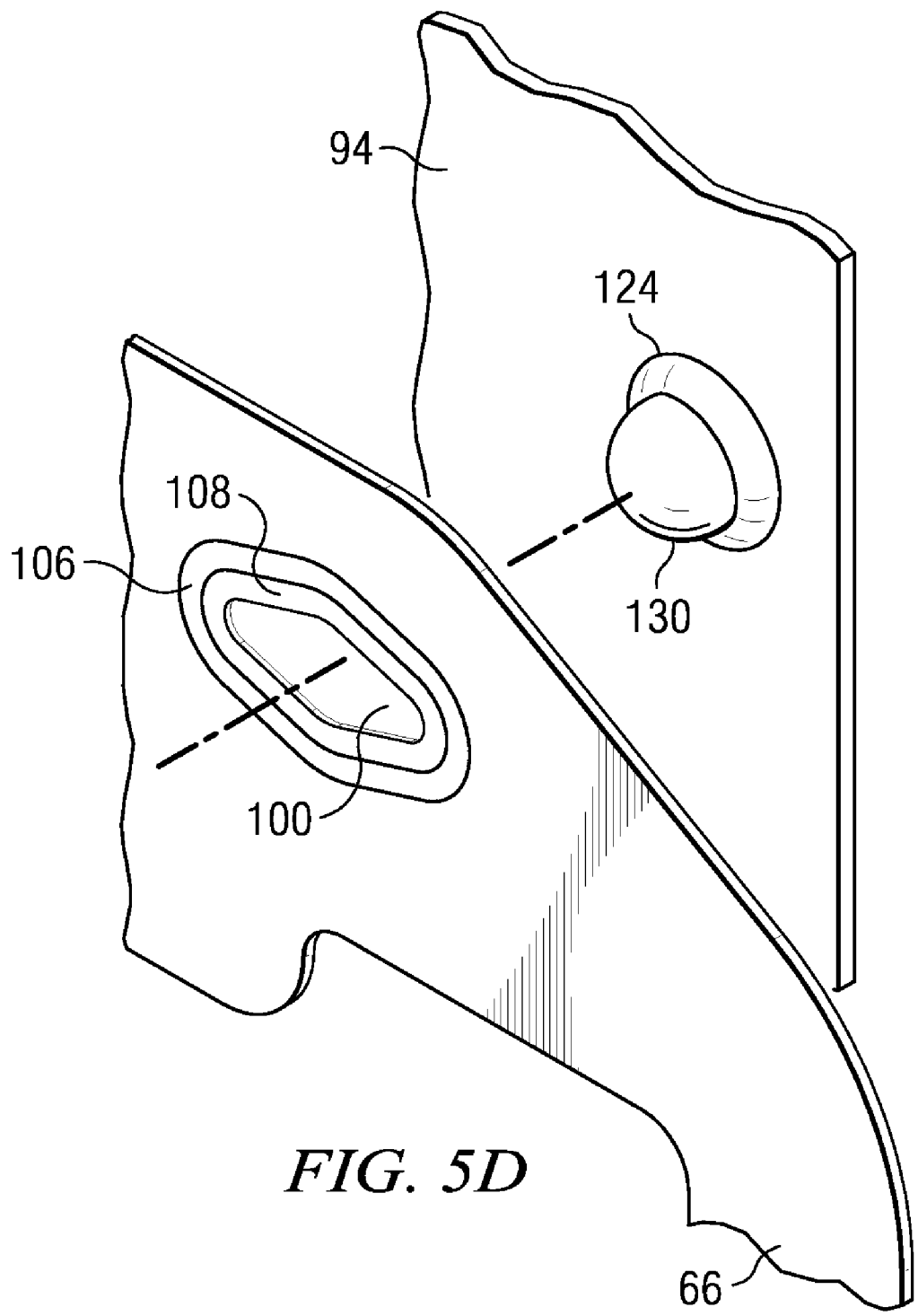
FIG. 5D depicts a method to align a flexure tail with a flex cable according to another embodiment of the present invention.

FIG. 5D depicts a method to align a flexure tail 66 with a flex cable 94 according to another embodiment of the present invention. This method is similar to the method described with reference to FIGS. 5A-5B, except that the solder ball 130 is adhered to a bond pad 124 that itself includes a solder bump on the on the flex cable 94. Notice from FIG. 5D that the solder ball 130, when adhered to the solder bump of the bond pad 124, may sink into or flow partially into the solder bump of the bond pad 124, so that the resulting solder pin is not spherical. However, when the solder pin(s) is used for alignment (i.e. when the solder pin enters the alignment hole 100 in the terminal region 72 of the flexure tail 66), the solder ball 130 and the solder bump of the bond pad 124 are solid (i.e. in the solid phase as opposed to being in the liquid phase when entering the alignment hole 100). In the liquid phase, the solder cannot appreciably resist shear forces and therefore does not substantially effect alignment enough to be a practical alignment feature. Still, it is contemplated that sometime after alignment (i.e. after the solid solder ball(s) of the alignment pin enters the alignment hole 100) the terminal region 72 of the flexure tail 66, and the flex cable 94 may be heated in a region around the solder ball 130, until the solder pin melts. However, as described above, from an alignment viewpoint the solid solder pin is very different from a conventional solder cleat that enters a hole in a bond pad in the liquid phase and then later solidifies into a shape that could not pass through the hole in the solid phase.

Figure 6A:
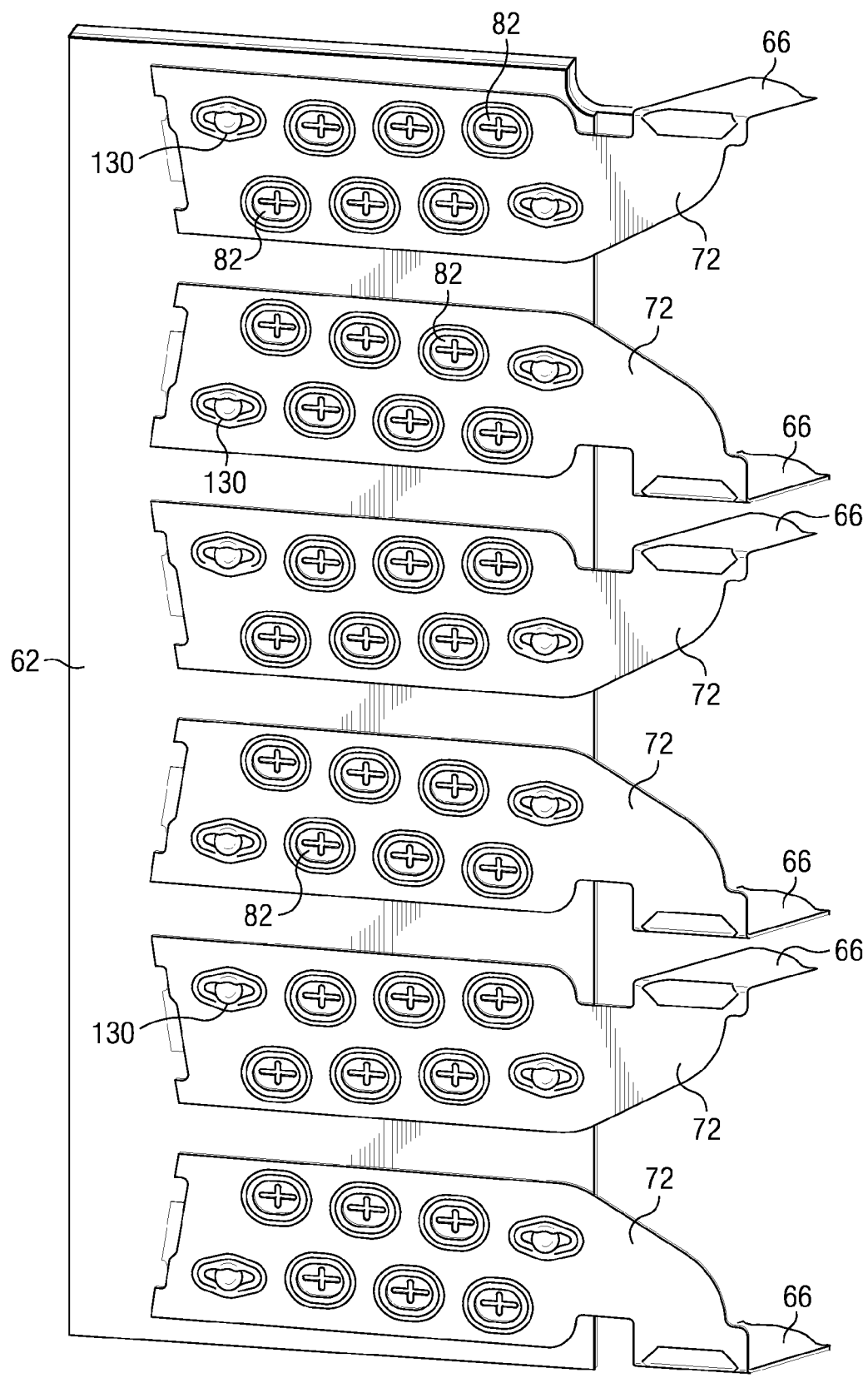
FIG. 6A depicts the post-assembly alignment of a plurality of flexure tails with a flex cable by a plurality of solder pins according to an embodiment of the present invention.

FIG. 6A depicts the post-assembly alignment of a plurality of flexure tails 66 with a flex cable 62 by a plurality of solder pins (each including a solid solder ball 130), according to an embodiment of the present invention. As shown in FIG. 6A, the flexure tails 66 are assembled with the flex cable 62 with the solder pins being disposed in the alignment holes, and with the electrical terminals 82 of the terminal regions 72 being aligned with the connection points 80 of the flex cable 62 (e.g. to facilitate electrical coupling between the traces defined in the conductive layer of the laminated flexure 34 with the electrical connection points 80 of the flex cable 62).

Figure 6B:
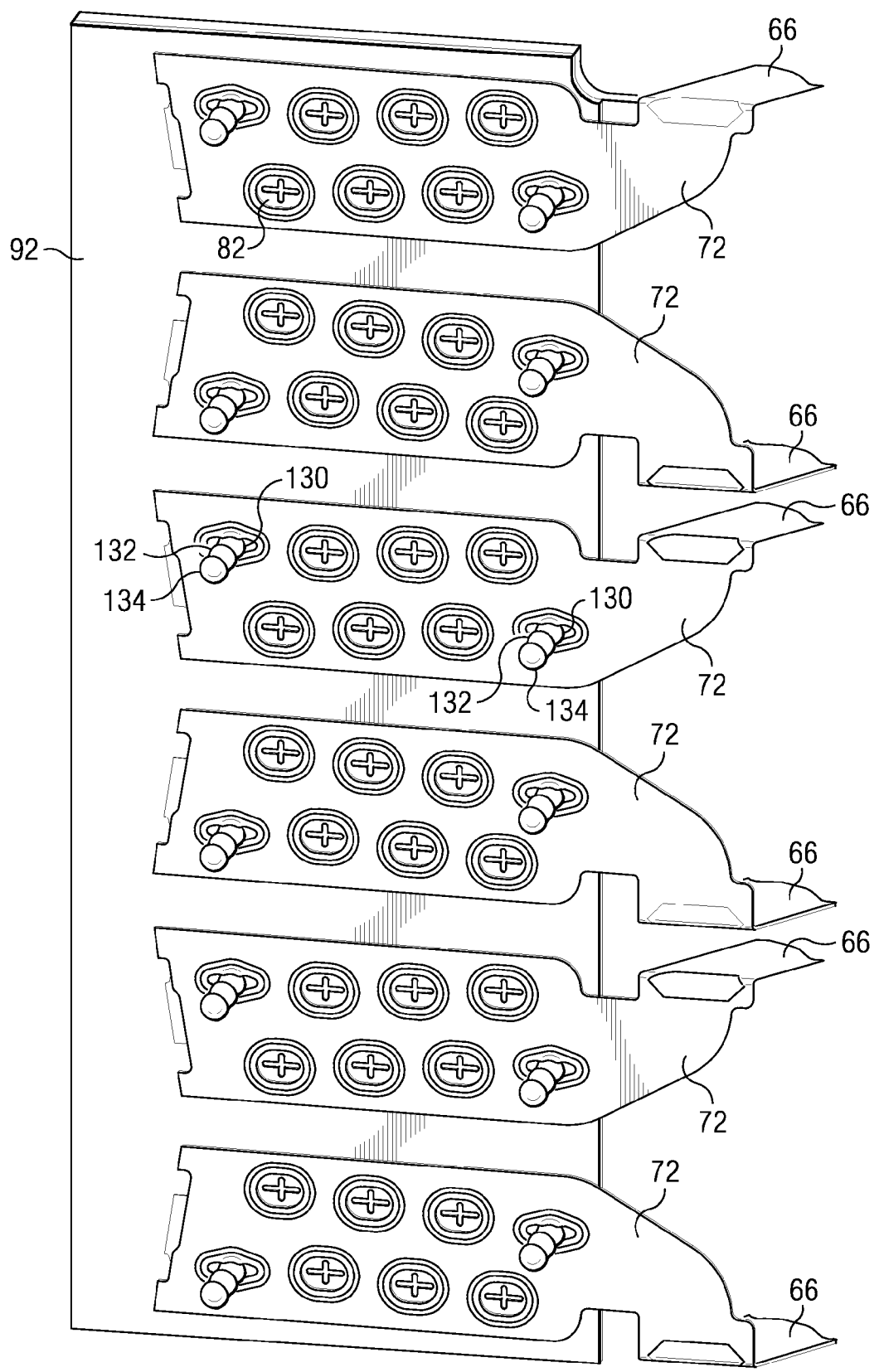
FIG. 6B depicts the post-assembly alignment of a plurality of flexure tails with a flex cable by a plurality of solder pins according to another embodiment of the present invention.

FIG. 6B depicts the post-assembly alignment of a plurality of flexure tails 66 with a flex cable 92 by a plurality of solder pins (each including solid solder balls 130, 132, and 134 attached to each other in a stack arrangement), according to another embodiment of the present invention. As shown in FIG. 6B, the flexure tails 66 are assembled with the flex cable 92 with the solder pins being disposed through the alignment holes, and with the electrical terminals 82 of the terminal regions 72 being aligned with the connection points 80 of the flex cable 92 (e.g. to facilitate electrical coupling between the traces defined in the conductive layer of the laminated flexure 34 with the electrical connection points 80 of the flex cable 92).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A method to align a flexure tail of a head gimbal assembly (HGA) to a flex cable of a head stack assembly (HSA), the method comprising:
    adhering at least one solder ball to a bond pad on the flex cable; and
    entering the solder ball into a first alignment hole in the flexure tail while the solder ball is solid.

2. A method to align a flexure tail of a head gimbal assembly (HGA) to a flex cable of a head stack assembly (HSA), the method comprising:
    adhering at least one solder ball to a bond pad on the flex cable; and
    entering the solder ball into a first alignment hole in the flexure tail while the solder ball is solid;
    wherein adhering the at least one solder ball to the bond pad further comprises adhering a plurality of solder balls to each other in a stack, to form a solid solder pin that protrudes from the bond pad.

3. The method of claim 2 wherein the plurality of solder balls includes at least two solder balls but no more than five solder balls.

4. The method of claim 2 further comprising passing the solid solder pin through the first alignment hole.

5. A method to align a flexure tail of a head gimbal assembly (HGA) to a flex cable of a head stack assembly (HSA), the method comprising:
    adhering at least one solder ball to a bond pad on the flex cable; and
    entering the solder ball into a first alignment hole in the flexure tail while the solder ball is solid;
    wherein the at least one solder ball defines a solder ball diameter in the range 50 µm to 400 µm.

6. The method of claim 5 wherein the first alignment hole defines a first alignment hole width that is 0 µm to 20 µm less than the solder ball diameter.

7. The method of claim 6 wherein the flexure tail comprises a laminate that includes a structural layer, a dielectric layer, and a conductive copper layer, and wherein the conductive copper layer defines an interior edge of the first alignment hole.

8. The method of claim 7 wherein entering the solder ball into the first alignment hole further comprises deforming the conductive copper layer adjacent the interior edge of the first alignment hole.

9. The method of claim 7 wherein the structural layer and the dielectric layer are radially recessed from the interior edge of the first alignment hole, relative to the conductive copper layer, by 30 µm to 50 µm.

10. The method of claim 5 wherein the first alignment hole defines a first alignment hole length that is 100 µm to 400 µm greater than the solder ball diameter.

11. A method to align a flexure tail of a head gimbal assembly (HGA) to a flex cable of a head stack assembly (HSA), the method comprising:
    adhering at least one solder ball to a bond pad on the flex cable;
    entering the solder ball into a first alignment hole in the flexure tail while the solder ball is solid; and
    heating the flexure tail and the flex cable in a region around the at least one solder ball, after entering the solder ball into the first alignment hole, until the at least one solder ball melts.

12. A head stack assembly (HSA) comprising:
    an actuator including an actuator body and an actuator arm extending from the actuator body;
    a flex cable adjacent the actuator body, the flex cable including a plurality of bond pads and at least one solid solder ball adhered to at least one of the plurality of bond pads;
    a head gimbal assembly (HGA) attached to the actuator arm, the HGA including a load beam;
        a laminated flexure attached to the load beam; and
        a head attached to the laminated flexure;
        the laminated flexure including a flexure tail that includes a plurality of conductive traces;
        the flexure tail including a terminal region where the plurality of conductive traces terminate at a corresponding plurality of electrical terminals that are configured to be electrically connected to the flex cable, the terminal region also including a first alignment hole;
    wherein the at least one solid solder ball protrudes into the first alignment hole.

13. The HSA of claim 12 comprising a second solid solder ball that is adhered on top of the at least one solid solder ball in a stack arrangement to form a solid solder pin, the solid solder pin protruding from the bond pad and passing through the first alignment hole.

14. The HSA of claim 13 wherein the solid solder pin comprises no more than five solder balls.

15. The HSA of claim 12 wherein the at least one solder ball defines a solder ball diameter in the range 50 µm to 400 µm.

16. The HSA of claim 15 wherein the first alignment hole defines a first alignment hole width that is 0 µm to 20 µm less than the solder ball diameter.

17. The HSA of claim 16 wherein the flexure tail comprises a laminate that includes a structural layer, a dielectric layer, and a conductive copper layer, and wherein the conductive copper layer defines an interior edge of the first alignment hole.

18. The HSA of claim 17 wherein the structural layer and the dielectric layer are radially recessed from the interior edge of the first alignment hole, relative to the conductive copper layer, by 30 µm to 50 µm.

19. The HSA of claim 15 wherein the first alignment hole defines a first alignment hole length that is 100 µm to 400 µm greater than the solder ball diameter.

\* \* \* \* \*